April 5, 1966 G. D. WOODY 3,244,283
SELF-CLEANING STRAINING DEVICE
Filed Oct. 4, 1960 2 Sheets-Sheet 1

INVENTOR.
GEORGE D. WOODY
BY:
ATTORNEY

April 5, 1966  G. D. WOODY  3,244,283
SELF-CLEANING STRAINING DEVICE
Filed Oct. 4, 1960  2 Sheets-Sheet 2

INVENTOR:
GEORGE D. WOODY

BY:

ATTORNEY

United States Patent Office 3,244,283
Patented Apr. 5, 1966

3,244,283
SELF-CLEANING STRAINING DEVICE
George D. Woody, 2431 E. Club Drive, Atlanta, Ga.
Filed Oct. 4, 1960, Ser. No. 60,327
4 Claims. (Cl. 210—108)

This invention relates to a self-cleaning straining device and is particularly concerned with means, which may be automatically actuated if desired, for cleaning strainers by a reverse flow of fluid therethrough as well as means whereby such reverse flow cleaning may be accomplished without termination of a continuous flow of liquid to be strained through the apparatus.

Fluid strainers such as foraminous screens or the like have long been employed in various fluid supply lines, and for the most part the cleaning of the screens, after occluded foreign matters have inhibited the effective and efficient flow of fluid, has been accomplished by termination of the flow and removal of the screen by brushing, scraping, reverse fluid flow or the like. Termination of fluid flow for purpose of cleaning is, of course, inconvenient and time consuming. Attempts have been made to avoid the necessity of removing such screens by the installation of reciprocating or rotary brushes which may be periodically operated to remove accumulated foreign matter; however, to be effective some termination of the flow is required so as to provide for the removal of foreign matter accumulated and liberated by action of such cleaners.

In the present apparatus, applicant has provided means whereby a continuous flow may be accomplished while effectively and efficiently screening the fluid, and a reverse flow cleaning of the screen may be secured without termination of the continuous flow of material. In the present form of the invention such reverse flow is accomplished by the use of parallel filtering screens operated in selective alternate manner, the arrangement being such that as one screen is functioning to block foreign matter flowing through the device, the other screen may be subjected to a reverse flow which operates to discharge the foreign matter through a separate outlet. Periodic flows through the individual screens may be of any desired time sequence; however, one form of the present invention provides for the automatic changeover of flow from one screen to the other and a reverse flow cleaning of the screen from which the flow has been diverted to the companion screen.

It is therefore among the objects of the present invention to provide a novel and improved means for the continuous flow screening of fluent material.

Another object of the present invention is to provide a straining device for screening the flow of fluids together with means for the periodic effective and efficient cleaning of the screen without termination of the flow of fluid through the apparatus.

A further object of the present invention is to provide a fluid straining device by which fluid may be diverted from flow through one screen to that of another while permitting a reverse flow through the screen from which such flow has been diverted.

It is also an object of the present invention to provide a straining device which may be automatically operable to periodically and successively clean a plurality of screens such that each successive screen is cleaned immediately prior to the period in which it is used and cleaned immediately after such period.

Numerous other objects, features and advantages of the present invention will be apparent from a consideration of the following specification taken in conjunction with the accompanying drawings, in which.

Referring in detail to the embodiments chosen for the purpose of illustrating the present invention, it will be seen that the straining device is adapted for operation in conjunction with any suitable source of fluid such as the vat 10 which may be a treatment or storage container from which fluid is discharged through an inlet pipe 11 to enter the central portion of the body or cylinder 12 of the straining device of the present invention. While it is to be understood that the present self-cleaning straining device is by no means limited to any particular location or type of operation, it may be observed that, as here shown, the strainer is particularly adapted for use in food processing plants where the vat 10 may be a processing tank. The present invention is particularly suited for use in the processing of chocolate wherein the liquid chocolate syrup requires straining before ultimate discharge; in which case the vat 10 of FIG. 1 of the drawings may be considered as a melting or processing tank for such chocolate.

Figure 2:
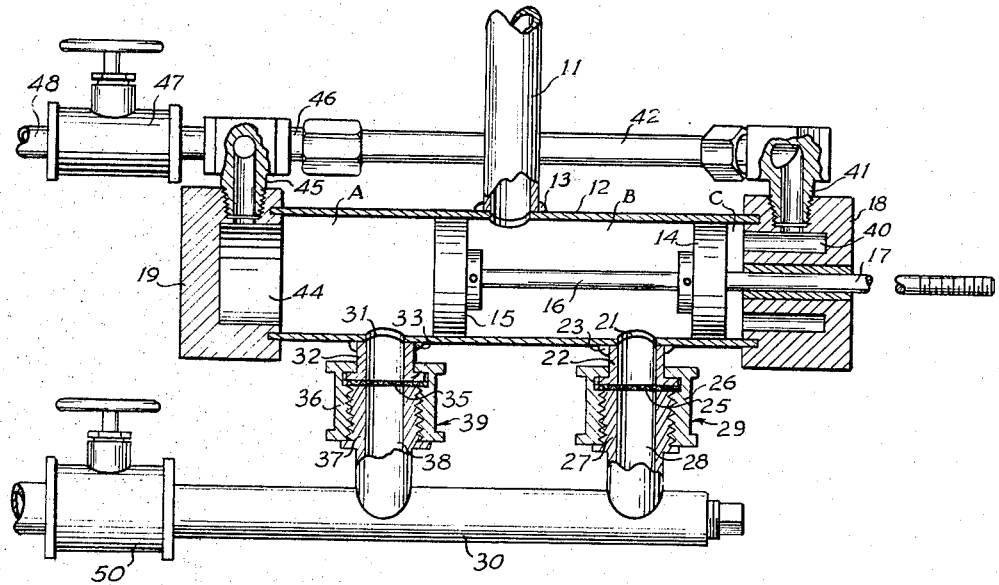
FIG. 2 is a horizontal sectional view of the straining device illustrated in FIG. 1.
Figure 4:
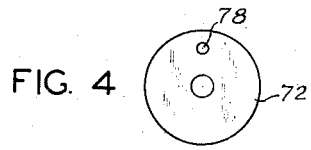
FIG. 4 is an end view of the piston used in the device illustrated in FIG. 3.

As more clearly illustrated in FIG. 2, the discharge pipe 11 of the vat 10 communicates with a central portion of the side wall of the cylinder 12 to which it may be secured as by welding or the like indicated at 13. The cylinder 12 provides an internal cylindrical chamber in which there is carried a pair of tandem arranged, right and left hand pistons 14 and 15 joined by a rigid connecting bar 16. Reciprocation of the tandem pistons 14 and 15 within the cylinder 12 is provided for by an externally extending rod 17 passing centrally through a right hand cylinder head 18. The opposite end of the cylinder 12 is closed by a companion cylinder head 19, such cylinder heads 18 and 19 defining with cylinder 12, a closed chamber separated by pistons 14 and 15 into three juxtaposed compartments A, B and C with the inlet pipe 11 communicating at all times with the central compartment B.

The cylinder 12 is provided with a pair of axially spaced outlet ports 21 and 31 which axially straddle the mouth of pipe 11. The distance between outlet ports 21 and 31 is approximately equal to the distance between the centers of pistons 14 and 15. The arrangement is such that, upon reciprocation of pistons 14 and 15, the pistons will simultaneously, respectively, pass the ports 21 and 31 so that port 21 communicates alternately with compartments B and C, and port 31 communicates alternately with compartments A and B. Further, when port 31 is in communication with compartment A, port 21 is in communication with compartment B, and conversely, when port 31 is in communication with compartment B, port 21 is in communication with compartment C.

Leading from ports 21 and 31 are pipes denoted generally by numerals 29 and 39, respectively, the pipes terminating in a common discharge pipe 30. Pipe 30 is provided with a discharge valve 50 which controls the back pressure in cylinder 12.

Within pipes 29 and 39 are the removable strainers 25 and 35, which are preferably perforated plates or screens retained in place by fittings. In more detail, pipes 29 and 39 are divided into abutting sections between which are the strainers 25 and 35. The inner sections of pipes 29 and 39 are provided with annular flanges 22 and 32 surrounded by internally threaded couplings 26 and 36, respectively. The couplings 26 and 36 threadedly engage the external threads on nipples 27 and 37 so that upon being tightened, the couplings 26 and 36 urge the flanges 22 and 32 toward the nipples 27 and 37 so as to clamp the strainers 25 and 35 therebetween.

With the parts arranged as shown in FIG. 2, the fluid is pumped by pump 20 from vat 10 through pipe 11 into compartment B and must pass through port 21 since the pistons 14 and 15 are to the right of ports 21 and 31, respectively, and piston 15 prevents the fluid from passing through port 31. It will be seen that in the position of the parts as indicated in FIG. 2, should the strainer 25 receive and restrain such quantities of foreign matter so as to preclude the efficient and effective flow of material therethrough, the tandem pistons 14 and 15 may be moved toward the left of FIG. 2 by axial movement of the rod 17 to dispose the piston 14 between the inlet pipe 11 and the discharge port 21 of the cylinder 12. Such movement will also move piston 15 to the left past the left hand discharge port 31.

It thus will be understood that a continuous flow of fluid from the inlet pipe 11 may be selectively directed, by pistons 14 and 15, for flow, from the central compartment B, through either one of the strainers 25 or 35. Considering this arrangement of the structure for mounting the strainers, it will be understood that the two strainer assemblies heretofore described are identical. Reciprocation of the rod 17 will provide for the successive diversion of the flow of material through either selected strainer assembly.

For the reverse cleaning of the strainer 25, the head 18 is provided with an internal annular passage 40 open to the compartment C and communicating through a nipple 41 with a cleanout discharge tube 42. In a similar manner, the cylinder head 19 is formed with a chamber 44 communicating by a nipple 45 with an extension 46 of the cleanout discharge pipe 42 and thence to a control valve 47 past which the cleanout fluid may be discharged through the pipe 48 and returned to tank or vat 10.

With the tandem piston arrangement in the position shown in FIG. 2, it will be seen that while the material to be strained or filtered and discharged enters through the pipe 11 and is discharged through port 21 to the pipe 30, a back pressure of fluid under the control of the valve 50 causes an upward flow of fluid through the strainer 35 into compartment A and thence through the chamber 44, outwardly through the nipple 45, discharging through the pipe 48 into vat 10. The upward flow of material through the strainer 35 will, of course, dislodge any foreign matter which has accumulated thereon and will discharge the same from the apparatus into vat 10.

When it is desired to clean the strainer 25, the tandem pistons 14 and 15 are moved to the left of FIG. 2 whereupon the piston 14 will be in a position intermediate the inlet 11 and the outlet port 21 and while the piston 15 is between the outlet port 31 and the chamber 44 of the cylinder head 19. Thus, incoming fluid from pipe 11 will pass directly to the port 31 through the strainer 35 to the discharge line 30. Back pressure of fluid in the line 30 will cause some fluid to flow to compartment C on the right side of the piston 14 and thence through the channel 40 and nipple 41 to the cleanout discharge tube 42. Such back pressure will, of course, wash out the strainer 25 with the upward flow of fluid carrying such foreign matters as may have been accumulated thereon outwardly through the discharge pipe 48. The incoming liquid, because of the position of piston 15, is precluded from entering compartment A.

Figure 1:
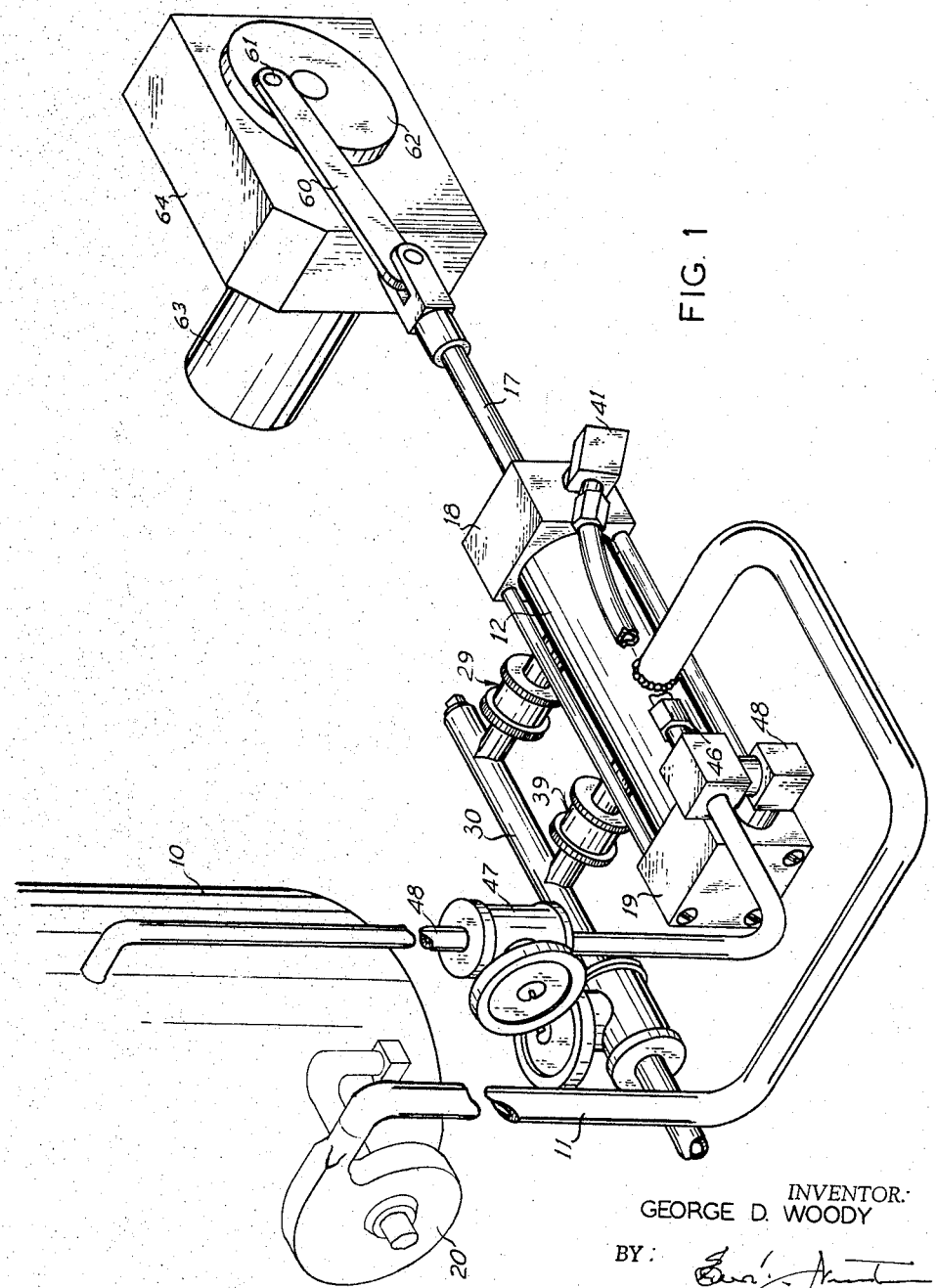
FIG. 1 is a fragmentary perspective view of a self cleaning straining device constructed in accordance with the present invention, the straining device being illustrated as connected to a vat of liquid.

It will now be seen that, by the control of the location of the pistons 14 and 15 through the operation of the rod 17, incoming fluid may be selectively passed through either one of the strainers 25 or 35, while a portion of the strained fluid will pass upwardly through the screen not in use to dislodge foreign matter and discharge the same. While the rod 17 may be manually operated or periodically operated by any type of power mechanism, as seen in FIG. 1, a continuous periodic movement is applied to the rod 17 by a pitman 60 pivotally connected to an eccentrically mounted pin 61 on drive disc 62, the disc 62 being driven by a motor 63 through the gear box 64. By such an arrangement it will be seen that the flow of fluid may be automatically, continuously and successively discharged through the strainers 25 and 35 one after another, each strainer being subjected to the return flow which cleans it as the other screen is in active duty restraining foreign matter from passage through the apparatus.

Figure 3:
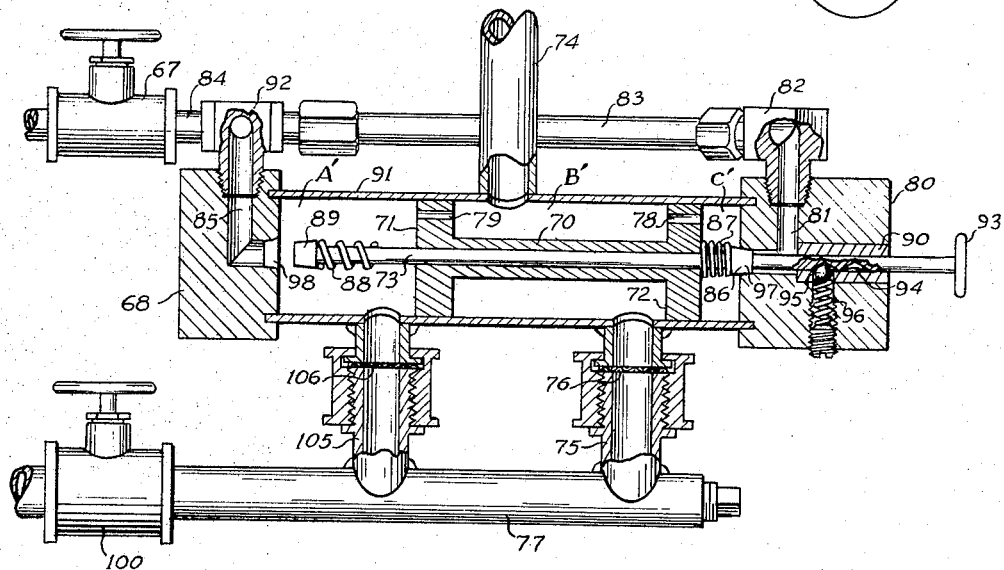
FIG. 3 is a view similar to FIG. 2 and illustrating a modified form of the invention.

The apparatus as disclosed in FIG. 3 is one in which the push of incoming fluid itself may provide for an automatic movement of the pistons to reverse the flow through the selected screen. In the embodiment shown in FIG. 3, the device includes, as in the previous embodiment, a cylinder 91 provided at opposite ends with heads 80 and 68. An inlet pipe 74 communicates with the central chamber defined by cylinder 91 and a pair of spaced discharge pipes 75 and 105 which lead from the cylinder 91 to a common discharge pipe 77 having a control valve 100. The pipes 75 and 105 are respectively provided with strainers 76 and 106.

Within cylinder 91 is the tandem piston arrangement including the left hand piston 71 and the right hand piston 72 connected together by a connecting shaft 70. The fluid to be strained is admitted to cylinder 91 through the central inlet pipe 74 and passes, when the parts are in position shown in FIG. 3, into compartment B' between the pistons 71 and 72 to the outlet pipe 75 and thence through strainer 76 to the discharge pipe 77 having a control valve 100. It will be noted, however, that both pistons 71 and 72 are provided with orifices 78 and 79, respectively, through which a portion of the incoming fluid passes into compartments A' and C'. The purpose of these orifices 78 and 79 will be described hereinafter.

The pistons 71 and 72 are mounted on a control rod 73 which passes through an axial bore in shaft 70 and through a bushing 90 in the right hand head 80 of cylinder 91. The outer end of rod 73 beyond head 80 is provided with a handle 93 by which the rod 73 may be mechanically operated. The rod 73 also contains spaced recesses 94 into either of which a ball 95, carried in a bore in head 80, is urged by a spring 96, when that particular recess 94 is aligned with the bore of head 80.

Within the cylinder 91, rod 73 is provided with a plug 86 in compartment C' and a similar plug 89 on its end in compartment A'. Coiled springs 88 and 87 are slidably mounted on rod 73 between piston 71 and plug 89 and between piston 72 and plug 86. The plugs 86 and 89 are adapted to respectively close exit ports 97 and 98 leading from compartments C' and A', respectively, to passageways 81 and 85 of heads 80 and 68. The distance between plugs 86 and 89 is less than the distance between ports 97 and 98; therefore, only one port 97 or 98 will be closed at a time depending upon the position of rod 73. Passageway 81 leads to a cleanout fluid discharge nipple 82 through which fluid from compartment C' passes to a fluid discharge tube 83 and thence to a discharge pipe 84 having control valve 67.

In the operation of the embodiment shown in FIG. 3, the rod 73 is manually arranged, say to the right, so that plug 86 closes port 97. The ball 95 will thus resiliently hold rod 73 in that position until a relatively stronger force acts to move rod 73 to the left.

As the fluid enters compartment B', it passes through strainer 76 and via pipes 75, 77 and through valve 100. The restriction of valve 100 builds up a back pressure diverting part of the fluid through strainer 106 into compartment A' and thence through port 98 and passageway 85 to pipe 84. Under such conditions, the strainer 76 collects foreign matter.

As the foreign matter is built up on strainer 76, there is a progressively increased pressure drop across the strainer 76 with a resulting higher pressure differential between compartment A' and B' as well as between compartment A' and C', the pressure between compartment B' and C' being substantially equalized because of orifice 78 and the resulting static condition of the fluid in compartment C'. On the other hand, the gradual flow of fluid through orifice 79 does not build up appreciable pressure in compartment A' since it is open through passageway 85. The increasing pressure differential between compartment A' and C' eventually is sufficient to urge pistons 71 and 72 to the left, thereby shifting rod 73 to the left and causing plug 89 to close port 98 while removing plug 86 from port 97. Under such conditions, fluid from compartment B' passes through strainer 106 with a portion of the fluid passing back through strainer 76 to remove the foreign matter via compartment C', port 97, passageway 81, tube 83 and pipe 84. With continued use, strainer 106 becomes clogged with foreign matter creating a pressure differential as above described but in the opposite direction, resulting eventually in the return of the pistons 71 and 72 to their original position as shown in FIG. 3 and then the cycle repeats itself.

In this form of the invention it will, of course, be understood that the adjustment of the valves 67 and 100 may be such as to control the responsiveness of piston movement with respect to fluid pressures and build-up of resistance by the strainers. In similar fashion, control of the valves 47 and 50 of the apparatus of FIG. 2 may be likewise adjusted to the same end.

From the foregoing it will be seen that the present invention provides a novel, effective and efficient means for maintaining a continuous flow of fluid through a screening apparatus which may be actuated to provide for flow through successive screens in successive manner, the arrangement being such as to provide for the cleaning of each filter or strainer after use by the back flow of material passing through the opposite strainer. In the practice of the invention it will be understood that numerous changes, modifications and the full use of equivalents may be resorted to without departing from the spirit or scope of the invention as defined in the appended claims.

I claim:

1. A fluid cleaning device comprising, a housing defining a chamber therein, first and second discharge ports positioned adjacent opposite ends of said chamber and communicating therewith, a centrally located inlet port communicating with said chamber, first and second intermediate discharge ports communicating with said chamber, conduit interconnecting said intermediate ports, a stationary filter associated with each of said intermediate discharge ports, means downstream from said filters for creating back pressure in said conduit, first and second spaced and interconnected piston elements slidably fitted within said chamber, and means for moving said piston elements simultaneously and successively within said chamber between a first position and a second position; whereby when in said first position fluid entering from said inlet port enters said chamber, is filtered through said filter associated with said first intermediate discharge port, and is discharged through said conduit, said back pressure means forcing a portion of said filtered liqiud through said filter associated with said second intermediate discharge port to back wash same and for discharge through said second end discharge port, and when in second position the fluid entering from said inlet port enters said chamber, is filtered through said filter associated with said second intermediate discharge port and is discharged through said conduit, said back pressure means forcing a portion of said filtered liquid through said filter associated with said first intermediate discharge port to back wash same and for discharge through said first end discharge port.

2. A cleaning device as set forth in claim 1 and further characterized in that the means for moving the piston elements is manually operable.

3. A cleaning device as set forth in claim 1 and further characterized in that the means for moving the piston elements is automatically responsive to the fluid flow resistance of said fluid filters.

4. A cleaning device as set forth in claim 3 and further characterized in that each of the piston elements includes at least one perforation therethrough.

References Cited by the Examiner

UNITED STATES PATENTS

| | | | |
|---|---|---|---|
| 2,434,427 | 1/1948 | Muller | 210—102 |
| 2,679,320 | 5/1954 | Walton | 210—102 |
| 2,940,517 | 6/1960 | Skellern | 210—333 X |
| 3,077,989 | 2/1963 | Larkin | 210—333 X |

REUBEN FRIEDMAN, *Primary Examiner.*

HARRY B. THORNTON, HERBERT L. MARTIN, CHARLES SUKALO, *Examiners.*

S. ZAHARNA, *Assistant Examiner.*